United States Patent [19]

Frost et al.

[11] 4,247,066
[45] Jan. 27, 1981

[54] AIRFOIL VARIABLE CAMBERING DEVICE AND METHOD

[75] Inventors: Richard C. Frost; Eduardo W. Gomez; Robert W. McAnally, all of Fort Worth, Tex.

[73] Assignee: General Dynamics Corporation, Fort Worth, Tex.

[21] Appl. No.: 879,650

[22] Filed: Feb. 21, 1978

[51] Int. Cl.² .............................................. B64C 3/48
[52] U.S. Cl. ..................................... 244/219; 244/214
[58] Field of Search ................. 244/219, 214, 218, 87, 244/53 B

[56] References Cited

U.S. PATENT DOCUMENTS

| | | | |
|---|---|---|---|
| 1,365,346 | 1/1921 | Schenkel | 244/219 |
| 1,868,748 | 7/1932 | Hogan | 244/214 |
| 3,704,828 | 12/1972 | Studer et al. | 244/219 X |
| 4,012,013 | 3/1977 | Ball et al. | 244/219 X |

FOREIGN PATENT DOCUMENTS 2041145  4/1971  Fed. Rep. of Germany ........... 244/219

*Primary Examiner*—Barry L. Kelmachter
*Attorney, Agent, or Firm*—Charles E. Schurman

[57] ABSTRACT

Airfoil device and method providing smooth, continuous, variation in airfoil camber and surface curvature over substantially the entire length of the device by use of a trusslike bendable beam as an airfoil rib having the airfoil skin surfaces flexibly slidable relative thereto. The beam is divided chordwise into upper and lower beam members each formed of a plurality of articulated sections. The beam members are connected by a bendable jackscrew which upon rotation causes one member to move chordwise, and its curvature to be changed, relative to the other thereby effecting deflection of the airfoil with concomitant variation in its camber and the curvatures of its outer skin surfaces.

27 Claims, 12 Drawing Figures

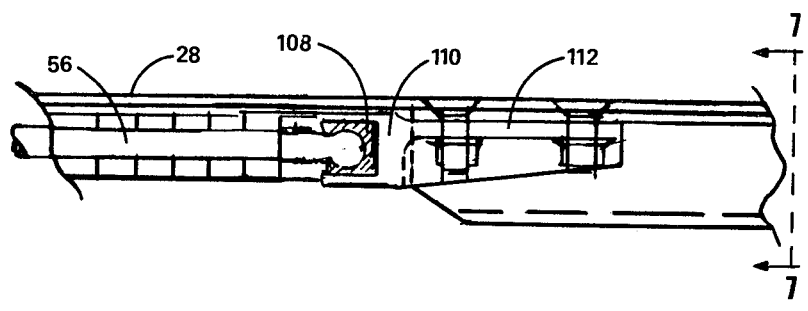
FIG.6
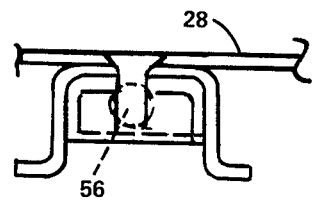
FIG.7
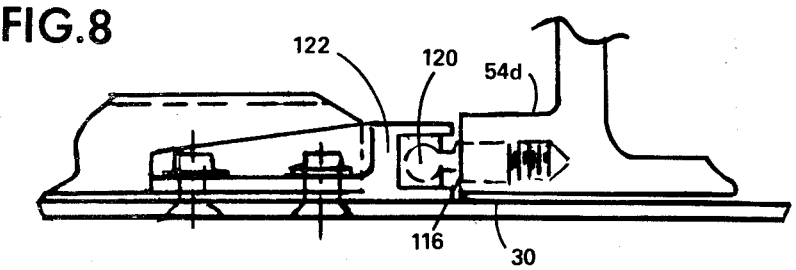
FIG.8
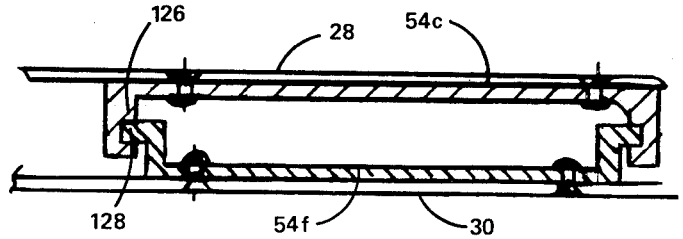
FIG.9
FIG.12
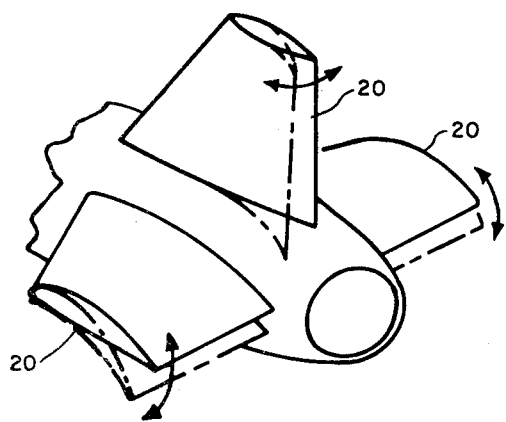

AIRFOIL VARIABLE CAMBERING DEVICE AND METHOD

BACKGROUND OF THE INVENTION

The invention relates to devices and method for altering the chamber and exterior contour of airfoils. As the development of high performance aircraft structures has advanced, it has been recognized for some time that airfoils used in such structures have improved efficiency and usefulness in some circumstances if the airfoil camber and its outer surface or skin curvatures can be varied to result in a different configuration or curvature. This is particularly desirable with supercritical wings in transonic aircraft in order to reduce drag to a minimum over the full operational speed range. However, while numerous devices have been proposed for producing variable camber devices, most are subject to undesirable limitations such as lack of structural strength, too great bulk for available space, have weight disadvantages, are undesirably complex or do not allow for the desired changes in curvature. Thus, while it is known to move an entire fixed contour portion of an airfoil, for example, the well known extension or deflection of leading or trailing edge flaps in an aircraft wing, such devices are usually limited to alteration of camber by the repositioning of such fixed geometry structure and are unable to vary camber and airfoil surface curvature smoothly and continuously over substantially the entire surface or extent thereof both chordwise and spanwise of the airfoil.

SUMMARY OF THE INVENTION

The present invention provides practical solutions to the above-referred-to drawbacks of prior structures and provide increased flexibility in the design of airfoils to have optimum contour over a greater range of flight conditions.

As used herein the term "airfoil" is intended to mean any surface or body used for the purpose of directing or deflecting an airflow and includes lifting body type airfoils, canards, flaps, vanes, ramps or other air directing or diverting surfaces. Airfoil camber is the mean line of curvature between the outer surfaces or skins of the airfoil.

In the present invention, it has been found that a variable camber airfoil can have its understructure, such as the typical chordwise extending airfoil rib for supporting the airfoil skin surfaces, provided as a bendable truss-like beam by dividing the beam longitudinally into generally opposed first and second beam members with the airfoil skin flexibility slidable thereover. When each beam member is divided into truss-like chord segments hinged together, then one beam member can be moved or repositioned generally chordwise, and its curvature changed, relative to the other members to cause the beam and thus the airfoil to deflect curvedly substantially the full chordwise length thereof and thus effect a smooth continuous variation in the airfoil camber and the closed curvature of its outer or skin surfaces. Jackscrew means are advantageously provided to movably connected one beam member to the other by connecting the segments of the one member with those of the opposite beam member and to move or positionally shift one or more segments of one beam member with respect to one or more other segments generally chordwise by non-uniform amounts along the beam length. When the jackscrew is arranged to connect the beam members along the neutral axis of the beam the instananeous force required to bend the airfoil against a given loading is minimized with resulting decrease in weight, bulk and strength requirements for the operative structure.

Chord segments of the beam members may beneficially be arranged as generally oppositely positioned pairs of beam member segments, each pair together forming a variable geometry truss by the height of the beam. So constructed, the distance along one or more diagonals of each such beam truss bay, i.e., between upper and lower caps of the beam at the outer surfaces of the airfoil rib means, may be varied to cause the beam, the airfoil, to assume the new contours with the airfoil skin bending uninterruptedly over the rib means at all degrees of curvature.

A plurality of the bendable airfoil rib means can be employed spanwise of the airfoil and one or more such rib means can be varied in contour to a different camber and surface curvature than one or more others of the rib means when it is desired to produce a twist in the airfoil surface in the spanwise direction.

BRIEF DESCRIPTION OF THE DRAWINGS

The above and further objects and advantages of the invention will become more apparent from attention to the description following and the annexed drawings and explanation thereof depicting a preferred embodiment given by way of example only and not intended as limitative of the inventive concepts herein and wherein;

FIG. 5 is an enlarged view, partially in section, of the area 5 of FIG. 1;

FIG. 6 is a cross sectional view of an attachment node showing slidable connection of the airfoil's outer skin to the cambering device beam member, and taken along line 6—6 thereof;

FIG. 7 is an elevational view of the node of FIG. 6, taken along line 7—7 of FIG. 6;

FIG. 8 is a cross sectional view showing connection between the airfoil outer skin and the cambering device lower beam member taken along line 8—8 of FIG. 1;

FIG. 9 is a cross sectional view taken along line 9—9 of FIG. 1 showing the slidable connection at the airfoil trailing edge;

FIG. 12 is a partial view in perspective of an aircraft empennage showing use of the invention to vary the camber of the empennage airfoil surfaces.

DESCRIPTION OF THE PREFERRED EMBODIMENT

Figure 1:
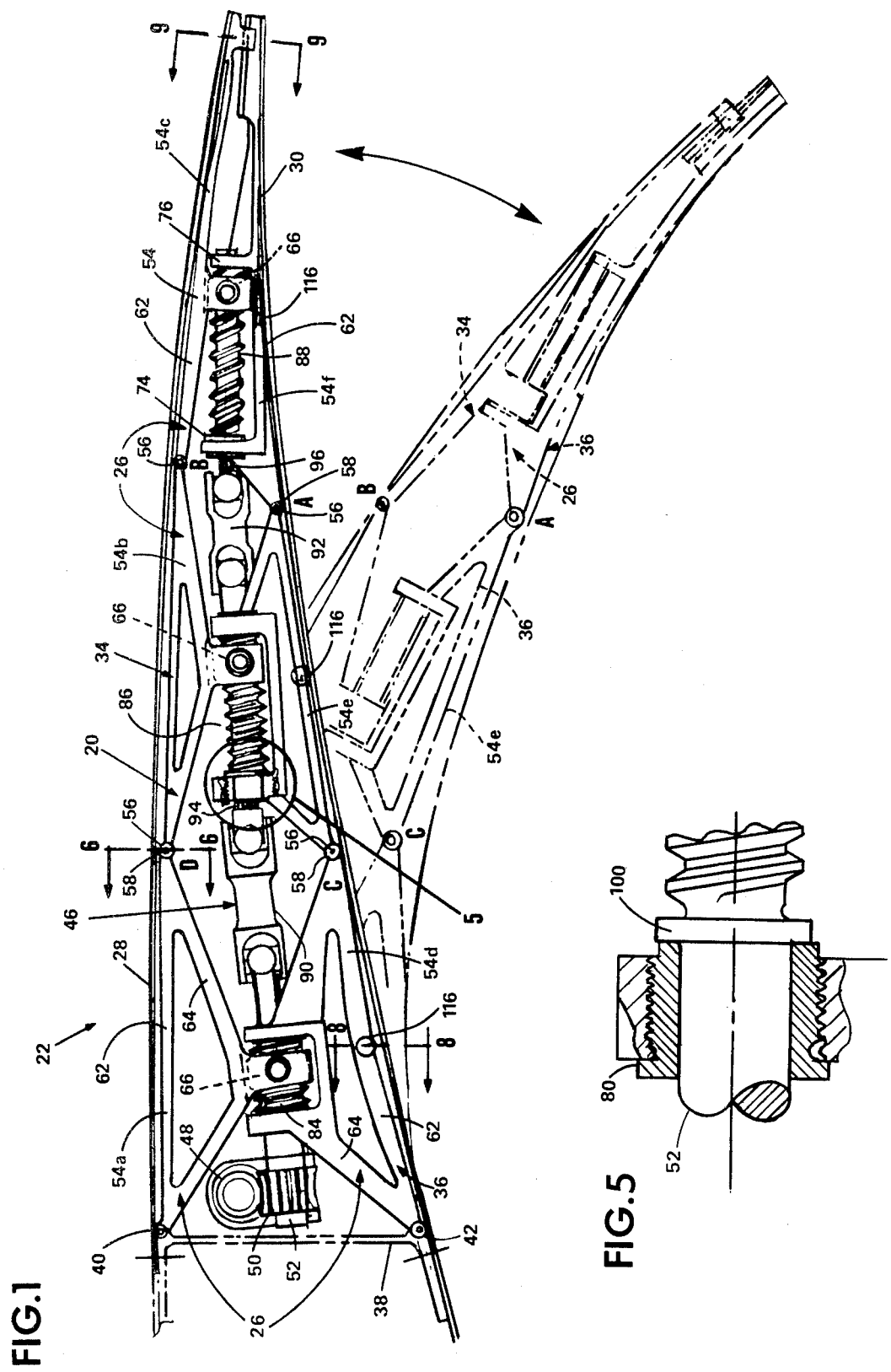
FIG. 1 is a cross sectional side view through an airfoil showing the airfoil variable cambering device of this invention.
Figure 2:
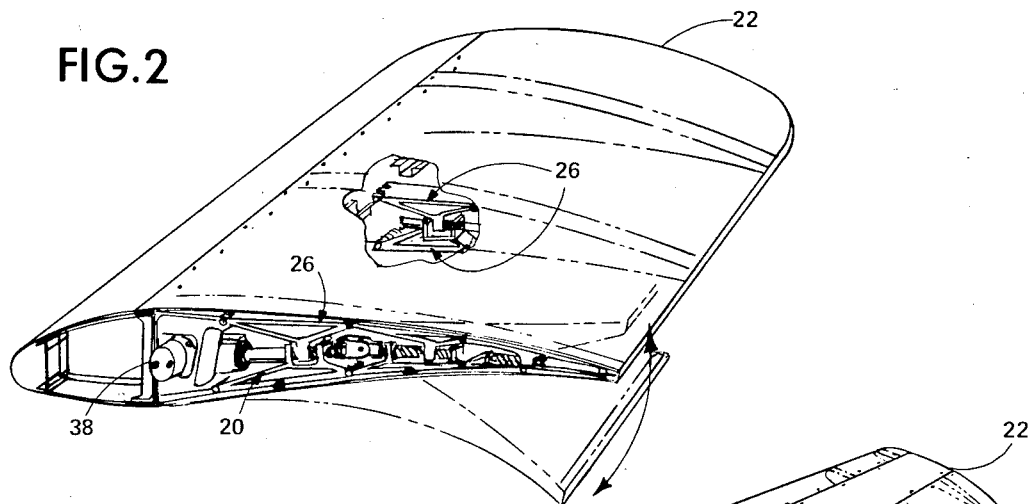
FIG. 2 is a perspective view of an aircraft wing partially cut away to show the variable cambering device positioned in the trailing edge of the wing.
Figure 3:
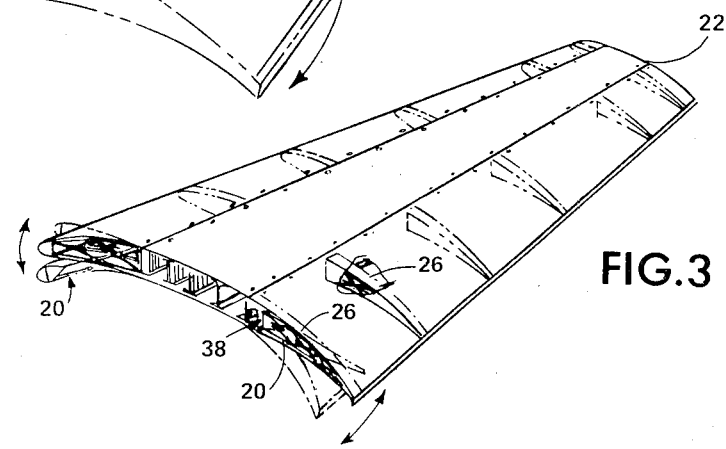
FIG. 3 is a view in perspective of another aircraft wing showing the variable cambering device positioned spanwise along both leading and trailing edges thereof.
Figure 4:
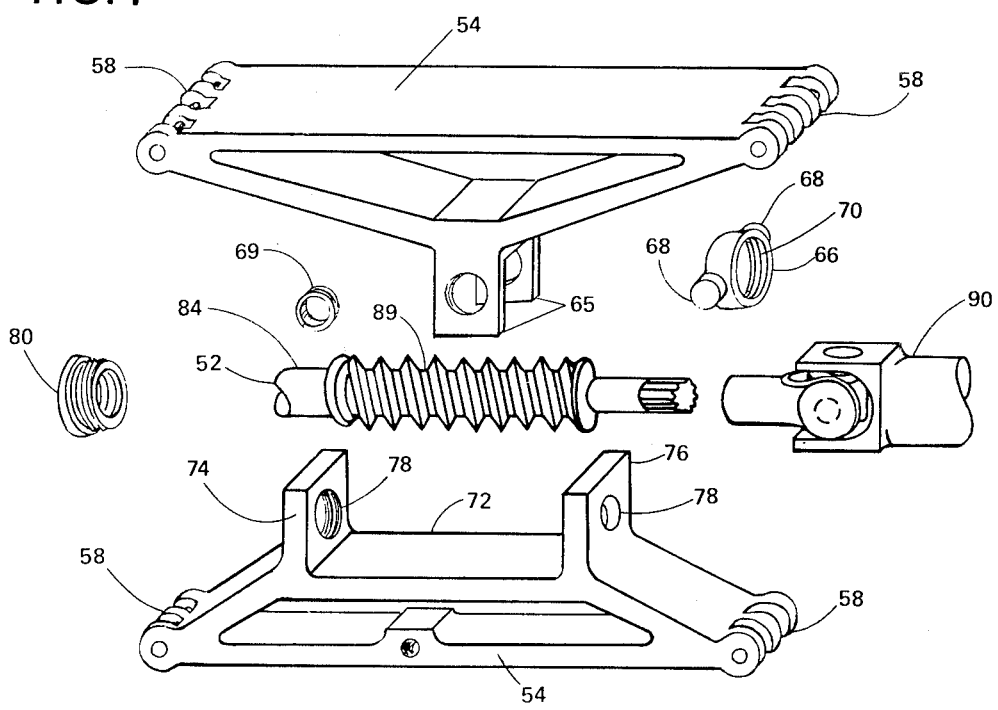
FIG. 4 is an exploded view in perspective of a portion of the variable cambering device.

Referring to the drawings, in FIG. 1, a variable cambering device 20 of the invention is shown positioned in an aircraft wing 22 in the trailing edge portion to form a rib means for the wing. Device 20 is provided as a bendable structural beam 26 having as its airfoil or wing outer surface the upper and lower wing skins 28 and 30 slidably attached to the beam 26. The beam is longitudinally (or chordwise) divided into upper and lower beam members 34 and 36 respectively pivotally connected to wing spar 38 at hinge pivots 40 and 42. Each beam member is positionally movable one with respect to the other to provide for changing the shape of the beam which permits it to be bent or flexed up or down thereby varying the camber of the airfoil and its outer surface as the position of each beam member is shifted with respect to the other about the hinges 40 and 42.

The upper and lower beam members 34 and 36 are movably connected one to the other by a bendable jackscrew means 46 which can be turned or revolved by motor means (not shown) operable to turn the jackscrew when desired through worm gear 48 bearing on shaft gear 50 at the forward end of the jackscrew shaft 52.

Each beam member 34 and 36 is constructed of three rigid beam member or truss chord segments 54a, b, c, d, e and f forming triangular segments, the segments of each member being arranged in-line and flexibly connected together by hinge pins 56 passing through mating knuckles 58 at hinges 60 to form each beam member as an articulated series of trusslike structural segments movable one with respect to the other, which provides for the bending or deflecting of the device about pivots 40 and 42. Each upper and lower beam member segment or chord segment has a beam cap portion 62 and a beam web portion 64, the web being triangular in concept so that the base of the triangle lies at the beam cap portion. Each upper segment has a yoke 65 at the apex of the triangle. A nut means 66 is journaled in each yoke and pivotal on lugs 68 via bushings 69. The nut defines interiorly threaded aperture 70.

Each lower beam member segment or chord segment is also substantially triangular in function with the base of the triangle forming a beam cap portion and lying along a portion of the airfoil outer surface, the beam web portion extending triangularly inwardly from the cap portion. The apex area of each triangular lower beam member segment is constructed as an upwardly open, yoke-like box or U-shaped recess 72 each having forward and after ends or bulkheads 74 and 76. Defined through each bulkhead is an interiorly threaded hole 78 each provided with a mating bushing-like thrust bearing 80. Each recess is adapted to receive one of the yokes 65 and nut means 66, of an upper beam member segment thus providing for a strong connection of the segments of the upper beam member to the lower beam member through jackscrew means 46 to produce a strong, variably bendable beam means as an airfoil rib.

It can be seen that the jackscrew means 46 have a plurality of screws or screw shafts respectively designated 84, 86 and 88 having exterior threads 89. The screws are flexibly connected together by universal joints 90 and 92 slidable telescopically on splines 94 and 96 so as to form flexible coupling means between each of the screws 84, 86 and 88. Each of these screws is threadedly positioned in its associated threaded nut aperture 70 with ends of the screw shafts journalled in thrust bearings 80 in the bulkheads of recesses 72. A thrust collar 100 at each end of each screw provides for transferring thrust at the bulkheads. Each upper beam member segment of the other beam member and when the jackscrew means 46 is revolved the segment of one beam member is positionably moved or displaced generally chordwise of the airfoil with respect to its opposite segment. Each of the screws 84, 86 and 88 differs in the pitch of its screw threads 102 in the ratio of 1:2:3 and the recesses 72 are longer the greater the thread pitch to accommodate the difference in relative movement which each nut means 66 makes along its respective screw as the jackscrew shaft 52 is turned. The difference in relative movement causes a progressively greater bending of the airfoil towards the trailing edge as will now be apparent. See the changed position of beam, airfoil and segments as shown in broken lines in FIG. 1.

Each pair of oppositely arranged triangular-like segments effectively forms a beam truss bay or truss bay portion of the beam effective to form a complete load bearing section of the beam. Each truss bay has as its beam caps the cap portions 62 and as its shear web the webs 64 connected by the jackscrew. By reference to the central pair of chord segments 54b and 54e of FIG. 1 in both the solid line and broken line positions it can be seen that the diagonal CB of a beam truss bay CABD changes, i.e., becomes shorter as its nut 66 travels to the left on its associated screw 86 and diagonal AD lengthens.

The upper skin surface 28 is slidably connected to the beam by free sliding connection thereto at nodes located at hinge pins 56 for the upper surface. For this purpose the pins have spherical heads embedded in cubes 108 made slidable in channels 110. Channels for each node are bolted by their flanges 112 to the upper skin (see FIGS. 6 and 7). The lower skins are similarly connected with the lowr beam member 36 at nodes 116 as shown in FIG. 8. The connection is similar to that for the skin to upper beam member connections except that the lower connection nodes are approximately midway between ends of the lower beam member segments where headed node pins 120 attached thereto and slide in lower channels 122 bolted to the wing skin.

Connection at the trailing edge between upper and lower skins is accomplished by the mating tongue and groove sliding connection of FIG. 9. Thus, the after edge of beam member segment 54c has a groove 126 and the segment 54f has a tongue 128 slidable therein, the upper and lower wing skins being respectively bolted to the trailing edges of these segments as seen in the Figure.

It is inherent to the construction that the beam, and thus the airfoil, is structurally rigid in all positions. Thus, it will be understood that in the embodiment shown the wing camber cannot be altered from any given position of contour by the application of external loads due to the inherent non-reversible characteristics of the jack-screw drive.

Figure 10:
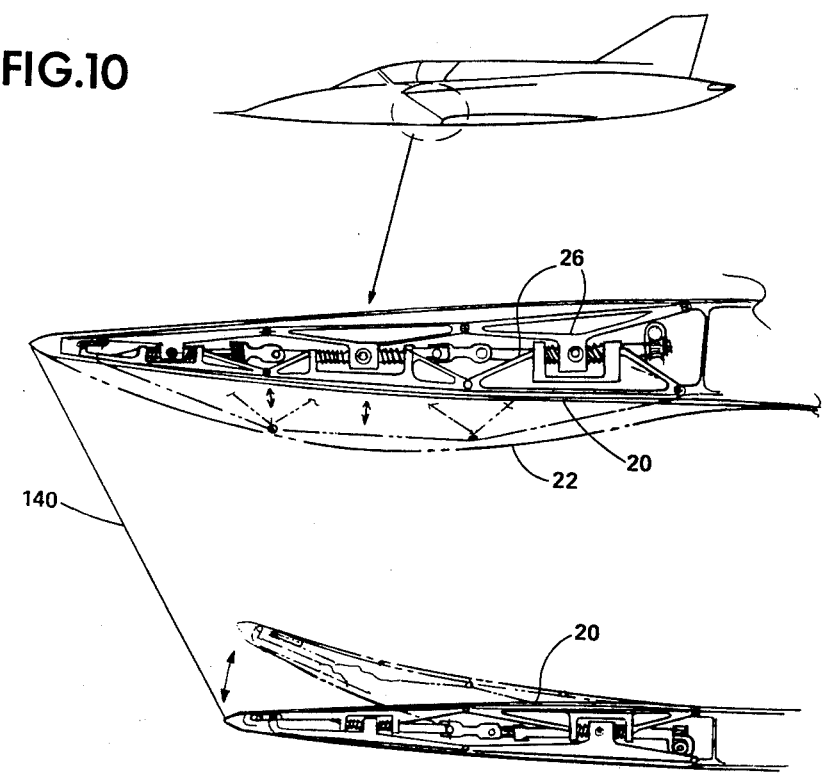
FIG. 10 is an elevational view showing use of the cambering device for varying the contour of a jet engine air inlet.
Figure 11:
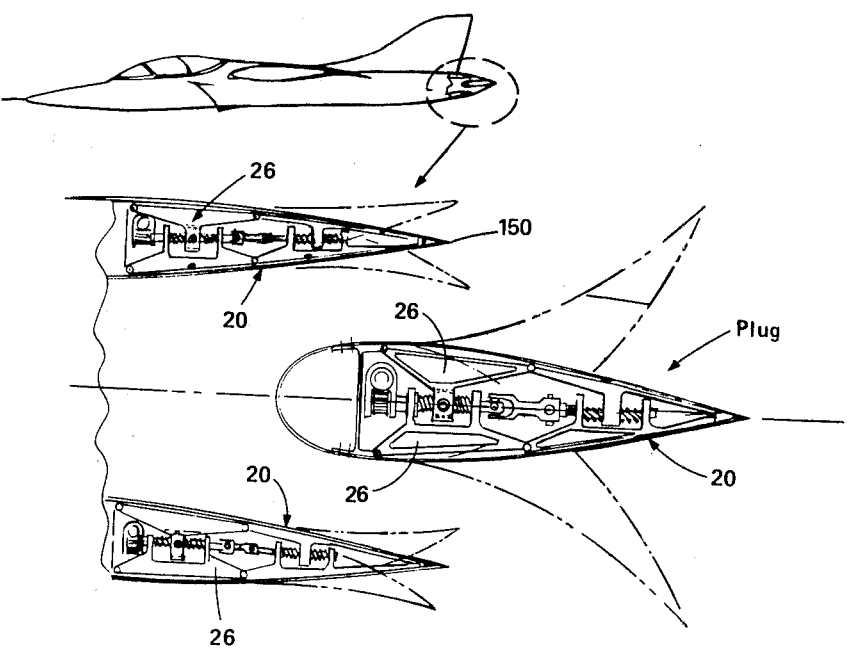
FIG. 11 is a side view of a jet engine exhaust nozzle showing use of the cambering device to vary the nozzle cross section.

The use of one of the airfoil devices of the invention in an aircraft jet engine inlet will be apparent from FIG. 10 showing inlet 140, and its use in an exhaust nozzle 150 for a jet engine or exhaust passage for a jet aircraft is seen in FIG. 11.

FIG. 12 shows the airfoil of the invention used in airfoil portions of an aircraft empennage.

It will be appreciated that the airfoil skin is freely slidable with respect to the beam over substantially the full extent of such bendable rib means. When necessary, then, the rib can form a structural beam for the airfoil substantially independent of the airfoil skin but giving continuous structural support thereto over the length of the beam.

It will also be appreciated that the chordwise length and/or height of one or more of the beam member segments can be made shorter or longer and/or the variation in travel differential between adjacent segments varied according to the particular camber and surface curvatures desired. Therefore, the invention makes possible use of variable camber airfoils which require airfoil surfaces whose curvature is a splined series of differing curvatures.

Various modifications may be made by those skilled in the art without departing from the spirit and scope of the herein described inventive concepts as defined in the appended claims.

We claim:

1. An airfoil variable cambering device for varying the camber and the outer surface curvature of an airfoil in a smooth, continuous fashion over substantially the entirety thereof which comprises:
    airfoil rib means positioned in the airfoil for giving structural support thereto,
        outer directed portions of the rib means approximately defining a major portion of the airfoil cross section;
    airfoil outer skin means arranged over said outer directed portions of said rib means to form substantially smoothly continuous outer surfaces for the airfoil;
    means connecting said skin means to said rib means;
    the rib means being formed as a bendable beam divided into first and second beam members each extending substantially the length of the beam;
        said beam members being positionally movable chordwise one with respect to the other so as to alter the beam contour; and
    jackscrew means connecting said first and second beam members and rotatable to effect said chordwise movement of said beam members one with respect to the other;
    whereby rotation of the jackscrew means causes one of said beam members to be positionally shifted relative to the other beam member to provide a smooth continuous variation in the camber of the airfoil and the curvature of its outer surface.

2. The variable cambering device of claim 1 in which said airfoil skin means is connected with said bendable rib means to freely and flexibly slide thereover.

3. The variable cambering device of claim 2 in which said skin means over said rib means is slidable relative thereto over substantially the full chordwise extent of the rib means.

4. The variable cambering device of claim 1 in which the mean lines of curvature of said first and second beam members are variable one with respect to the other.

5. The variable cambering device of claim 1 in which said beam members are respectively hinged to and pivotable about axes at opposite outer surface areas of the airfoil.

6. The device of claim 1 in which chord segments of one of said beam members are arranged generally opposite chord segments of the other beam member and positionally movable relative thereto to form generally opposed pairs of segments, each pair together forming a truss bay portion of the beam substantially the full height thereof, the geometry of said truss bay portion being variable by shifting the position of one of said segments with respect to the other of said segments whereby to lengthen or shorten the length of a diagonal of said truss bay portion.

7. The variable cambering device of claim 6 in which the extent of said positional shifting is variable as between pairs of said oppositely positioned chord segments.

8. The variable cambering device of claim 1 in which means are provided for turning said jackscrew means in both forward and reverse directions.

9. The variable cambering device of claim 1 in which said jackscrew means comprises a jackscrew shaft having a plurality of spaced apart threaded shaft sections serially flexibly connected along the axis of the shaft, the pitch of the threads varying as between at least two of said shaft sections.

10. The variable cambering device of claim 9 in which there are three of said threaded shaft sections, the threads thereof respectively varying in pitch by a ratio of 1:2:3.

11. The variable cambering device of claim 9 in which at least one of said threaded shaft sections is movable generally chordwise with respect to another of said threaded shafts along the axis of said jackscrew means.

12. The variable cambering device of claim 1 in which said jackscrew means connects said relatively movable beam members along approximately the longitudinal neutral axis of said beam.

13. An airfoil structure having means therein for varying the camber and outer surface curvatures thereof in a smooth continuous fashion which comprises:
    airfoil rib means;
    airfoil outer skin means arranged thereover said rib means and said outer skin means together forming an airfoil;
        outer directed portions of the rib means approximately defining a substantial portion of said airfoil cross section with said skin means slidably connected over said rib means
    the rib means being formed as a bendable beam divided into first and second beam members each extending substantially the length of the beam;
        said beam members being positionally movable chordwise one with respect to the other so as to alter the beam contour; and
    jackscrew means connecting said first and second beam members and rotatable to effect said chordwise movement of said beam members one with respect to the other;
    whereby rotation of the jackscrew means causes one of said beam members to be positionally shifted relative to the other beam member to provide a smooth continuous variation in the camber of the airfoil and the curvature of its outer surface.

14. The airfoil of claim 13 in which a plurality of said rib means are positioned in the airfoil spanwise thereof.

15. The airfoil of claim 13 in which said airfoil forms a substantial portion of an aerodynamic lifting body.

16. The airfoil of claim 13 in which said airfoil forms the trailing edge portion of an aerodynamic lifting body.

17. The airfoil of claim 15 in which said lifting body is an aircraft wing.

18. The airfoil of claim 13 in which the airfoil is a portion of an aircraft empennage.

19. The airfoil of claim 13 in which the airfoil forms a portion of a jet engine exhaust nozzle.

20. The airfoil of claim 13 in which the airfoil forms a portion of an aircraft jet engine air intake.

21. The airfoil of claim 13 in which there are a plurality of said variable cambering means spanwise of said airfoil, at least one of said variable cambering means being bendable to greater or lesser degrees than at least one other of said variable cambering means whereby to impart a spanwise twist along said airfoil.

22. Method for varying the camber of an airfoil to produce smooth continuous variations in curvature both of the camber and the airfoil outer surfaces comprising:

providing a chordwise rib means as support for an airfoil outer surface in the form of a bendable beam divided into first and second beam members extending substantially the length of the beam;

each beam member having a plurality of trusslike chord segments hinged together to provide for flexure in each of said beam members and each beam member positionally shiftable generally chordwise one with respect to the other along their lengths, said first and second beam members being connected together by a flexibly rotatable jackscrew means;

turning said jackscrew means, and repositioning one of said beam members generally chordwise with respect to the other beam member to alter the position and curvature of one beam member with respect to the other beam member to effect a change in beam contour;

whereby the camber and exterior surface curvature of the airfoil are smoothly and continuously variable from previous to new positions and contours.

23. The method of claim 22 in which said airfoil outer surface is a skin means slidable with respect to said rib means and said repositioning of one of said beam members with respect to the other is simultaneous with the sliding of said skin means relative to outer directed portions of said rib means.

24. The method of claim 22 in which chord segments of one of said beam members are arranged generally opposite chord segments of the other beam member and positionally movable relative thereto to form generally opposed pairs of segments, each pair together forming a truss bay portion of the beam substantially the full height thereof, and said repositioning of one of said beam members with respect to the other beam member is accomplished by shifting one of the segments of at least one such pair generally chordwise relative to the other segment thereof so as to lengthen or shorten a diagonal of said truss bay portion between the cap portions of said beam.

25. The method of claim 24 in which said generally chordwise positional movement between the chord segments of a segment pair is variable.

26. The method of claim 24 in which said chordwise positional movement between the chord segments of a pair is variable relative to the positional movement between segments of another said segment pair.

27. The method of claim 22 in which a plurality of said bendable beam rib means are positioned spanwise of the airfoil and the camber of the airfoil is varied along the spanwise length by varying the bending of at least one of said rib means to a greater or lesser degree than at least one other of said rib means.

* * * * *